Patented Sept. 6, 1949

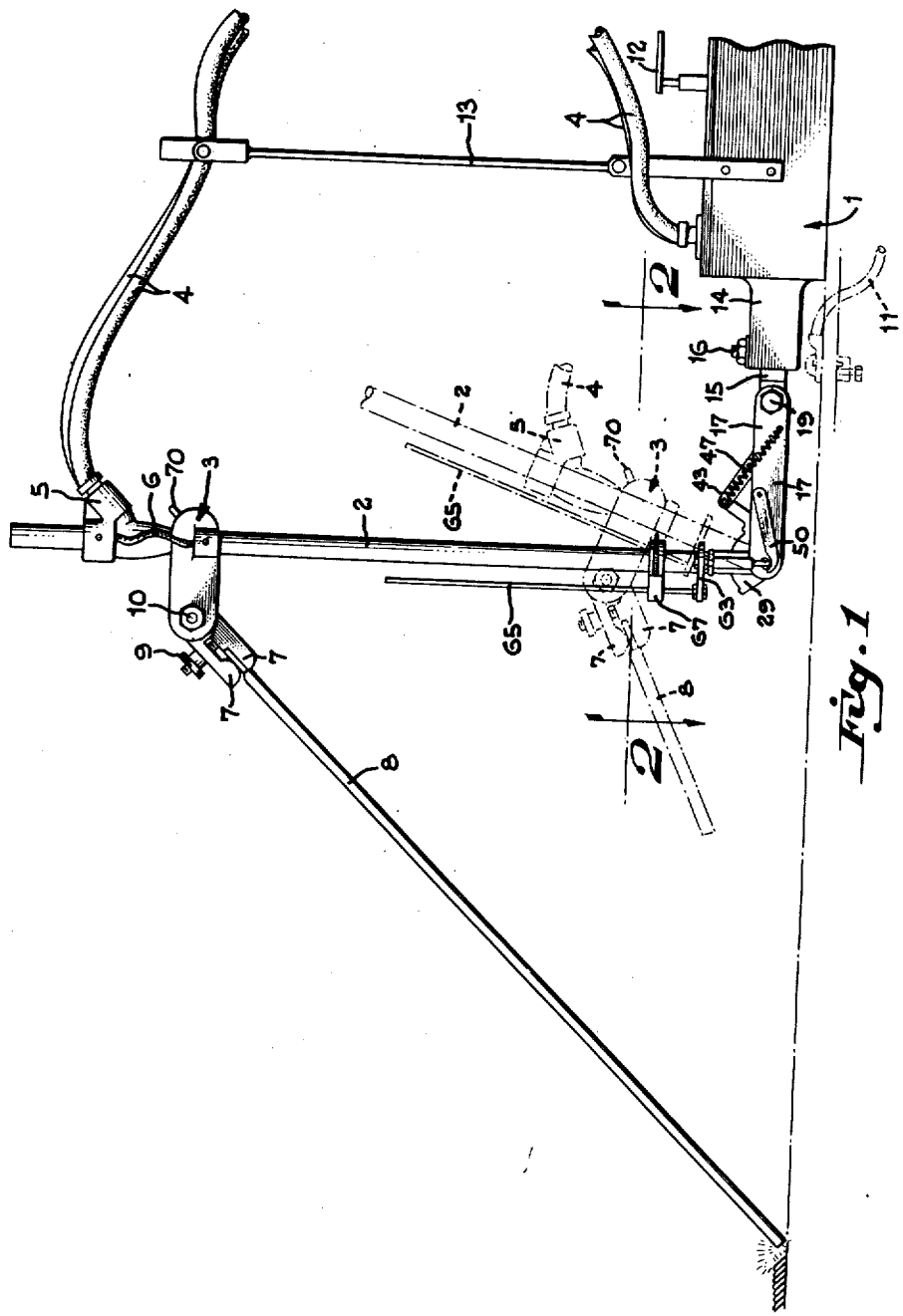

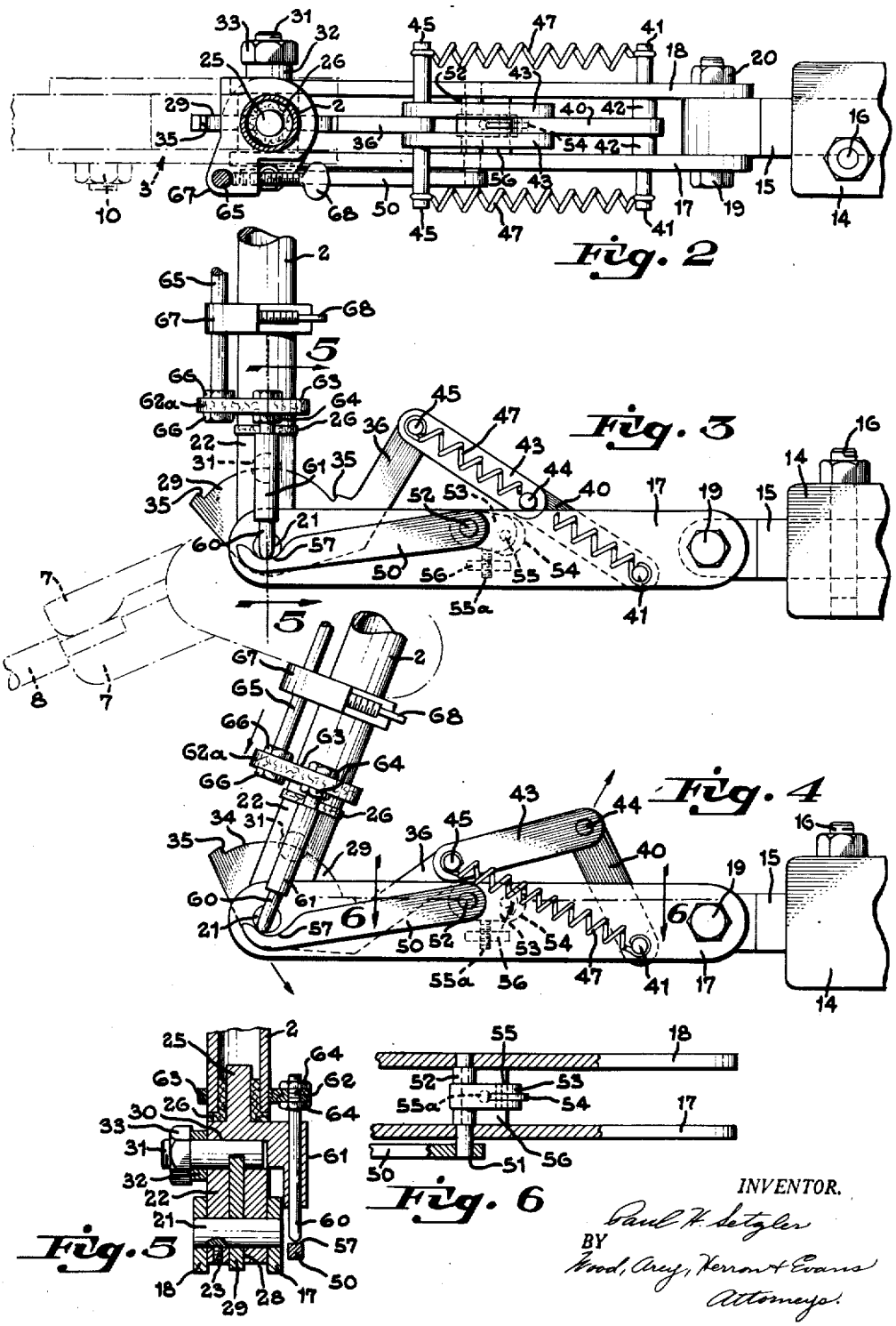

2,481,163

UNITED STATES PATENT OFFICE 2,481,163

SEMIAUTOMATIC WELDER

Paul H. Setzler, Hamilton, Ohio

Application September 11, 1948, Serial No. 48,911

9 Claims. (Cl. 219—8)

This invention relates to electric welding. It is directed particularly to a simple, semi-automatic welding machine which is adapted to be adjusted as to position and set into operation by a welder after which the machine continues to operate, without further guidance, until it shuts itself off automatically after depositing the whole of a rod or any predetermined portion thereof.

The principal purpose of the device is to relieve a welder of the tedious and time-consuming task of guiding the electrode by hand down the seam or path along which the weld is being made. In actual practice only a fraction of the welder's time, on the average only about 30%, is devoted to the productive operation of depositing metal; the remainder is expended in preparatory work, for instance, adjusting the parts which are to be welded together, replacing electrodes, arranging the welder in a workable position, cleaning slag, and the like.

In the present machine the electrode is guided and fed automatically; the apparatus, therefore, requires attention only during initial positioning and when electrode replacement is necessary. While the machine is in operation the welder is free to devote his time to positioning or replacing rods in similar machines which may be operating on adjacent parts of the work or to other preparatory work. In this manner the productive rate of one operator and one welding generator readily may be increased two or three-fold, and, at the same time, welds of uniform perfection are obtained.

The present application is a continuation in part of my U. S. pending patent application Ser. No. 666,065 filed April 30, 1946, now Patent No. 2,449,677, for welding rod feeder and it is directed particularly to apparatus for decommissioning the device when a welding rod has been consumed and a new one needs to be installed for resumption of the welding operation. Thus, the primary objective of the present invention has been to provide a welding machine capable of functioning substantially in an automatic manner while metal is being deposited from a welding rod, and subsequently disengages an unused portion of the rod from the work, at some predetermined point, without the attention of the operator, such that the machine may remain idle until a new rod is installed or until the machine is readjusted to weld along a different path. The invention contemplates a welding apparatus of the type described in which the welding operation may be terminated automatically at a pre-determined point upon the work, whether or not the welding electrode is completely used up. It is a further objective to provide an apparatus in which automatic decommissioning of the equipment may be caused to occur when welding rods of different lengths are utilized.

The apparatus shown in the aforesaid patent application consists of a post or column, and a head which is slidable or movable along the column, the head being constructed to support a welding electrode at an angle with respect to the work upon which the post is suitably rested or supported. In the operation of the device, an arc is struck between the tip of the electrode and the work, and, as metal is melted away from the electrode, it, and the head by which it is carried, descend relative to the column. This descension, because of the angularity between the electrode and the workpiece, and the continuously decreasing length of the rod, results in a linear movement of the arc along the work at a constant rate. The movement continues until the head reaches the bottom of the post or until the electrode is consumed. Preferably a slide clamp is employed which governs the rate of descent of the head upon the post in accordance with the rate of melting, or rate of consumption, of the electrode, as shown in the aforesaid patent application.

When a welding rod has been entirely consumed (except for that portion which is fastened in the head), it is desirable to extinguish the arc positively and abruptly, otherwise burning of the work or burning of the apparatus may occur. The present invention is predicated upon the concept of swinging the post or column of the apparatus in such direction that the entire head and associated spent or unused electrode portion are moved away from the work thereby extinguishing the arc. In the preferred construction of the present invention, the apparatus embodies a spring actuated mechanism which is normally idle but which swings the post and rod away from the line of weld at the pre-determined point of conclusion of a welding operation. The spring actuated mechanism is released, to perform this function, by means of an adjustable trip device which responds to movement of the head at a pre-determined point in its descent upon the post. In the conventional procedure, therefore, the trip is set to be engaged by the head when the head reaches a pre-determined point in its descent, as, for instance, at the point which corresponds to the consumption of a welding electrode, the point at which a new electrode is to be inserted, or the point at which a line of welding is to be stopped. Upon reaching this pre-determined position, the head actuates the trip to release the spring mechanism which swings the post, head, and unused portion of the electrode through a path separating the electrode from the work.

A typical embodiment of the invention constructed in accordance with these principles is illustrated in the drawings and is described in detail in the following specification.

In the drawings:

Figure 1 is a side elevation showing the apparatus in welding position in full lines and showing the elements of the apparatus in non-operative position in phantom lines;

Figure 2 is a sectional plan view taken on the line 2—2 of Figure 1, the parts being shown in operating position;

Figures 3 and 4 are enlarged fragmentary side elevations similar to Figure 1. In Figure 3 the relationship of the parts in operating position is disclosed, while in Figure 4 the relationship of the parts is illustrated just after the post has been swung to non-operating position;

Figure 5 is a sectional view taken on the line 5—5 of Figure 3; and

Figure 6 is a sectional view taken on the line 6—6 of Figure 4.

The apparatus shown in the drawings comprises a base indicated generally at 1 having a post or column 2 pivotally mounted thereon at its forward end. A head or electrode holder, indicated generally at 3 is slidably mounted upon the post or column 2, and electrical current is fed to the head 3 from one or more cables 4. The weight of the cables is supported by a follower 5, slidable on post 2, which bears upon the head 3, and which is in electrical connection with the head through one or more flexible electrical connectors 6.

The head and follower construction shown in Figure 1 is disclosed and claimed in the aforesaid pending application and the details of construction therefore are not repeated here. Essentially, the head is provided with cooperating jaws 7, 7 between which the shank of an electrode 8 may be fastened upon adjustment of a thumb screw 9. The jaws of the head are pivotally mounted on a bolt 10 of the head to permit the angle of the welding electrode to be varied, also, the head is so constructed that it is free to move upon the post when under the influence of the free weight load of the overhanging electrode, but binds itself upon the column when the far end of the electrode or its coating rests upon the work surface which is connected to one terminal of the power source by cable 11.

The base of the unit is adapted to form its principal support upon a work surface and, for this purpose, the base is sufficiently heavy to resist overturning forces of the attached column and electrode. If desirable, the base may be in the form of a housing constructed to receive a main cut-off switch which is not shown but which may be operated by a handle 12. Current is supplied to the switch by a power source not shown. Cables 4 extend from the switch, through the base to the follower 5. Preferably, the base is provided with a trellis 13 extending upwardly therefrom to sustain a portion of the weight load of the cables. It is the purpose of this arrangement, in conjunction with the follower, to relieve the head 3 from lateral forces exerted through the substantial weight of the cables, which might otherwise interfere with the linear descent of the head upon the column; thus, trellis 13 carries a substantial load of the weight of the cables, and the follower 5 may twist in response to lateral forces without transmitting them to the head upon which it is free to rotate.

In accordance with the present invention, the base 1 may be provided with a lug 14 at its forward end which is configurated to provide a socket for a stub member 15. The stub is fastened within the socket by means of a bolt 16 or other suitable fastening device.

Stub 15 is straddled by a pair of arms 17 and 18 which are mounted by means of a bolt 19, carrying a nut 20. This construction permits the arms 17, 18 to be adjusted angularly with respect to the base. At their forward ends, the arms 17 and 18 are cross-bored to receive a pivot pin 21 which extends between them so as to hold them in alignment.

Intermediate the arms 17 and 18, the pin 21 carries a stud member 22, which is held in fixed position upon the pin 21 by means of a lock screw 23 (Figure 5). Stud 22, extending upwardly from the arms 17 and 18 is counterturned, as at 25, to receive a shouldered washer 26.

This shouldered washer 26 is made from insulating material to electrically isolate the post, head, and follower, which are connected to one terminal of the power source, from the base 1 which is connected to the other terminal of the power source through metallic contact with the work. It will be recognized that other means could be utilized to isolate the two sides of the electrical circuit. The post or column 2 of the apparatus is preferably of tubular construction, to reduce its overall weight, and the lower end of its bore fits tightly over the washer 26 so as to mount the post rigidly upon the stud 22.

As will be noted in Figure 5, the stud 22 is slotted, as at 28, to receive a lever member 29 which is also journalled on the cross pin 21 and the stud is also cross-bored, as at 30, to receive a lock pin 31. This lock pin, at its inward extremity, is slotted to straddle the upper portions of the lever member 29 and the lock pin extends outwardly beyond the stud where it carries a washer 32 and also threadedly carries a lock nut 33. The slot 28 is sufficiently wide to allow the stud 22 to move with respect to the lever 29, but as the nut 33 is tightened, the lock pin 31 causes the parts to be bound together rigidly. Thus, this construction permits the post 2 to move pivotally with respect to the cross pin 21 when the lock nut 33 is loose, and permits the post to be fastened rigidly in given angular position when the lock nut is tight. Lever 29 at the area traversed by the stud 22 is of arcuate configuration as at 34 to facilitate locking of the post in various positions of angular adjustment, and abutments 35 are provided at the ends of the arcuate surface of the lever to act as limit stops. At its rearward end the lever 29 terminates in a tail piece 36 which extends between the arms 17 and 18 and which terminates at a point above them.

A breakable knee actuated by the influence of springs interconnects the tail portion 36 of the lever 29 with one or both of the side arms 17 and 18 to effect the swinging movement of the column 2 at the end of a welding operation. Thus, as illustrated best in Figures 3 and 4, a lever 40 is pivotally mounted intermediate the arms 17 and 18 on a cross pin 41. The lever 40 is centralized by means of bushings 42, 42 which reside between the respective side arms and the opposed faces of the link 40. At its opposite end, the link 40 is straddled by a pair of links 43, 43 which are connected thereto by means of a pivot pin 44. Links 43, 43 at their opposite ends straddle the tail portion 36 of the lever 29 with which they are interconnected by means of a pin 45. Pins 41 and 45 are extended beyond the respective levers which they interconnect and are grooved at their outward extremities, at points outside the side arms 17 and 18, to receive the respective end loops of tension springs 47, 47. When the levers 40 and 43 are in alignment, that is, when pin 44 is aligned with pins 41 and 45, the system is static and springs 47 are stretched to the greatest degree. However, when the center pin 44 is off the center line joining pins 41 and 45 or when the knee is slightly bent, then springs 47 are effective in swinging the tail portion 36 of the lever 29 in a downward direction and thus tilting the column 2 rearwardly.

For actuating the lever system just described so as to break the knee, the apparatus is equipped with a trip lever 50. This member as shown in Figure 6 resides along one of the side arms, 17, and at its one extremity is fastened rigidly as at 51 to a cross shaft 52 which is journalled in the side arms 17 and 18. Intermediate the side arms 17, 18 the cross shaft has a rocker arm 53 rigidly fastened to it and the rocker arm is slotted, rotatively to support a roller 54 which is held in place upon a pin 55. The roller is positioned to bear upon the underneath surface of lever 40 when the latter is in its lowermost, stiff position. The apparatus also includes an adjustment screw 55a which threadedly traverses a bore in a cross piece 56 extending between the side arms 17, 18 and carried thereby. This adjustment screw bears upon the lower surface of the rocker arm 53 and thus constitutes a stop which is effective for limiting the links 40 and 43 against over-center movement in the downward direction. Thus, the stop prevents the center pin 44 from traveling past the axis between pins 41 and 45, and therefore holds the linkage in a stiff but easily breakable position.

The forward extremity of the trip lever 50 is configurated to present an arcuate surface 57, which corresponds to a portion of a cylindrical surface having a common axis with pin 21. This surface is adapted to be engaged by a trip finger 60 extending through a guide sleeve 61 which depends rigidly from an upper portion of the stud member 22. At its upper extremity, the finger extends through a hole in a projecting boss portion 62 of a ring 63 which is constructed of electrical insulating material. The finger 60 is fastened to the ring 63 by means of nuts 64, 64 bearing upon opposite faces of the boss portion of the ring 63. Ring 63 is slidable freely upon the column 2. The ring 63 has another boss portion 62a which is bored to receive the lower portion of a trip rod 65, the rod being fastened to this portion by lock nuts 66, 66 bearing upon the opposite surfaces of the boss portion.

Trip rod 65 extends upwardly along column 2, and, at its upper extremity, passes through a bore in a collar 67. This collar is slidable freely upon the column 2 but the collar carries a thumb-screw 68 for fastening the collar 67 rigidly to the trip rod 65. The collar 67 may be positioned at various points along the length of the trip rod 65 and, being mounted on the column 2, is in the path of descent of the head 3. When the head is not in contact with the collar 67, the weight of the trip rod, ring and trip finger 60 is borne by lever 50, through engagement of the trip finger with it. This weight alone, however, is not great enough to trip the unlocking mechanism.

Operation of the apparatus

During welding operations in which a welding rod is in process of being consumed, the tripping mechanism just described is idle. The knee constituted by the links 40 and 43 is stiff inasmuch as the pins 41, 44 and 45 are in alignment as shown in Figure 3. In this position, the roller 54 bears upon the underneath surface of the lever 40 and the finger 60 bears upon the arcuate surface of the lever 50; the finger 60 thus sustains the weight of trip lever 65 and the associated collars 63 and 67 which are freely movable upon the column 2.

Assuming that the collar 67 of the trip assembly has been set upon the column 2 in a position corresponding to the point at which a welding rod will be consumed, the apparatus will remain in operation until the head 3 descends upon the column to bear its weight upon the collar 67. Under this as weight, the collar 67 will be forced downwardly, thereby depressing the trip rod 65 and the finger 60. The finger 60, moving downwardly, will swing the forward end of lever 50 in a downward direction and cause the roller 54 to bear upwardly upon the lower surface of the link 40. Slight upward movement of the link 40 is effective to break the knee since the system is under the influence of the tension springs 47. Therefore, since the rocker arm, through its associated roller 54 has lifted the arm 40, the springs are effective to cause the tail piece 36 of the lever 29 to be swung in a downward direction. Inasmuch as the column, at this time, is fastened to the lever 29 at the arcuate surface 34 by means of the lock pin 31, the entire column 2 will swing in a backward arc, abruptly lifting the unused portion of the welding rod from the work surface.

It is to be observed that drawing the electrode away from the work surface at the end of the weld is the equivalent of using an electrical switch to terminate the welding operations, but the method employed here has the distinct advantage of requiring no switch as such, and since the "contacts" of this equivalent switch are the rod end and the work they are constantly being renewed and cannot get out of order. The manner of terminating the weld described here has the further advantage of leaving the last metal deposited well fused with the work: as is not always the case in automatic welders of the type in which the weld is terminated by a mechanical stop which arrests the motion and feed of the rod at some predetermined point so that the arc dies slowly when sufficient metal has been deposited to cause the rod to recede so far that the voltage cannot sustain it.

To reset the system for the next successive operation, the spent rod is removed from the jaws 7, 7 of the head and a new rod is inserted. Then, with the head and follower in a raised position, (where they may be held temporarily, as by means of a thumb screw 70 bearing on the column) and preferably with the trip rod 65 also lifted with its associated pieces, the column is swung forwardly to reset the knee. In the alternative, the knee may be restored to a straight or stiff position by bearing upon the levers 40 and 43 at a point adjacent the center pivot 44 thereof. Either of such movements will cause the toggle levers to resume their straight position, and they will be prevented from overtravel beyond the stiff position since lever 40 will abut the roller 54 of the rocker arm 53 and the latter will abut the stop screw 55a which has been adjusted to conform substantially to dead center position of the levers. This movement reenergizes the springs and restores the lever 50 to trippable position. Then the trip rod 65 is lowered until the finger 60 rides upon the arcuate surface 57 after which the head is lowered upon the column 2 until the tip of the new welding rod contacts the work to strike a new arc. For convenience, a wad of steel wool placed at the piont where the tip of the rod will engage the work will facilitate striking the arc.

It is to be noted that the angular relation of the post to the work, and the angular relation between the electrode and the post during working of the unit will determine the line of weld that will be made by a rod of a given length. Therefore, angular adjustment between the rod and the post and angular adjustment of the post from vertical position conveniently enable the operator to deposit more or less welding metal per inch of weld to meet the working conditions.

Angular adjustment of the electrode with respect to the post conveniently is effected by means of the lock screw 10 at the head of the apparatus. Similar adjustment of the post with respect to the working surface is accomplished by loosening the lock screw 31 which permits the post to be swung to a desired position, after which the lock nut 33 may be tightened. The retracting mechanism operates in any position of angular adjustment of the post since the finger 60 bears upon the arcuate surface of the trip lever which is generated about the axis of pivot 21.

It is also to be observed that the functioning of the tripping mechanism is not dependent upon complete consumption of the welding rod. A welding operation may be terminated at any given point by adjustment of the collar 66 along the column 2.

Having described my invention, I claim:

1. A welding apparatus for depositing a weld upon a work surface, comprising, a base, a post supported from the base, an electrode holder slidably mounted upon the post, said holder being adapted to hold a welding rod at an angle to the post, with the opposite end of the rod disposed upon a work surface, means for regulating the descent of the holder in accordance with the rate of deposition of welding rod metal upon the work surface, and means, including a latch, adapted to be actuated by said holder at a predetermined point in its descent, for swinging the post and attached electrode abruptly away from the work surface.

2. In a welding apparatus of the type comprising a base having a substantially vertical column supported thereon and a holder for sustaining a welding electrode at an angle to the column and adapted to descend the column in accordance with deposition of weld metal from the electrode, the improvement which comprises a trippable element adapted to be actuated by the holder at a pre-determined point in its descent upon the column, and means controlled by said trippable element for swinging the column in a direction effective to disengage an unused portion of the welding electrode from the working surface and thereby terminate further deposition of weld metal from the electrode.

3. Apparatus for depositing a weld upon a work surface comprising a base, a column extending generally in vertical direction from the base and being pivotally mounted thereon, a holder slidably mounted upon the column and adapted to sustain a welding electrode at an angle to the column, said holder being arranged to descend the column as weld metal is deposited from the electrode tip, a trip member positioned to be engaged by the holder during its descent of the column, and mechanism responsive to the trip member for swinging the column pivotally to effect disengagement of the welding electrode from the work surface.

4. Apparatus for depositing a weld upon a work surface comprising a base, a post, a holder movable upon the post and adapted to sustain a welding electrode, a trip member adapted to be engaged by said holder during movement thereof along said post and a spring actuated overcenter mechanism for normally sustaining said post rigidly with respect to said base and constructed pivotally to swing the post and thereby disrupt engagement of the welding rod from the working surface in response to engagement of the holder with the trip member.

5. Welding apparatus comprising a base, a post pivotally mounted on the base, a holder movable upon the post, means associated with the holder for sustaining a welding electrode at an angle to the post and means associated with the holder for regulating the descent of the holder upon the post in accordance with the rate of deposition of welding metal from the electrode, a trip member positioned to be actuated by said holder at a predetermined point in its descent of the post, and means controlled by said trip member for swinging the post in a direction to disengage the electrode from a work surface.

6. Welding apparatus comprising a base, a post pivotally mounted on the base, a holder movable upon the post, means associated with the holder for sustaining a welding electrode at an angle to the post and means associated with the holder for regulating the descent of the holder upon the post in accordance with the rate of deposition of welding metal from the electrode, a trip member positioned to be engaged by said holder at a predetermined point in its descent of the post and means controlled by said trip member for swinging the post in a direction to disengage the electrode from a work surface, including a normally stiff knee, said trip member being effective upon actuation to collapse the knee.

7. Welding apparatus comprising a base, a post pivotally mounted on the base, a holder movable upon the post, means associated with the holder for sustaining a welding electrode at an angle to the post and means associated with the holder for regulating the descent of the holder upon the post in accordance with the rate of deposition of welding metal from the electrode, a trip member positioned to be engaged by said holder at a predetermined point in its descent of the post and means controlled by said trip member for swinging the post in a direction to disengage the electrode from a work surface, including a spring actuated normally stiff knee, said trip member being effective upon actuation to collapse the knee under the influence of the actuating springs thereof.

8. Welding apparatus comprising a base, a post, a holder movable upon the post and adapted to sustain a welding rod at an angle thereto, said post being pivotally supported from said base, a trip member adapted to be engaged by said holder at a pre-determined point in its descent upon said post, and a retracting mechanism responsive to said trip lever for pivotally moving the post to disengage the welding electrode carried by the holder from a work surface.

9. Welding apparatus comprising a base, a post, a holder movable upon the post and adapted to sustain a welding rod at an angle thereto, said post being pivotally supported from said base, a trip member adapted to be engaged by said holder at a pre-determined point in its descent upon said post, and a retracting mechanism responsive to said trip lever for pivotally moving the post to disengage the welding electrode carried by the holder from a work surface, said retracting mechanism including an actuating lever mounted upon the pivotal axis of the post and means for adjusting the post angularly with respect to said actuating lever.

PAUL H. SETZLER.

No references cited.